(No Model.)
S. G. CABELL.
APPARATUS FOR PURIFYING AND AGING LIQUORS AND PURIFYING WATER AND OIL.
No. 354,853. Patented Dec. 21, 1886.
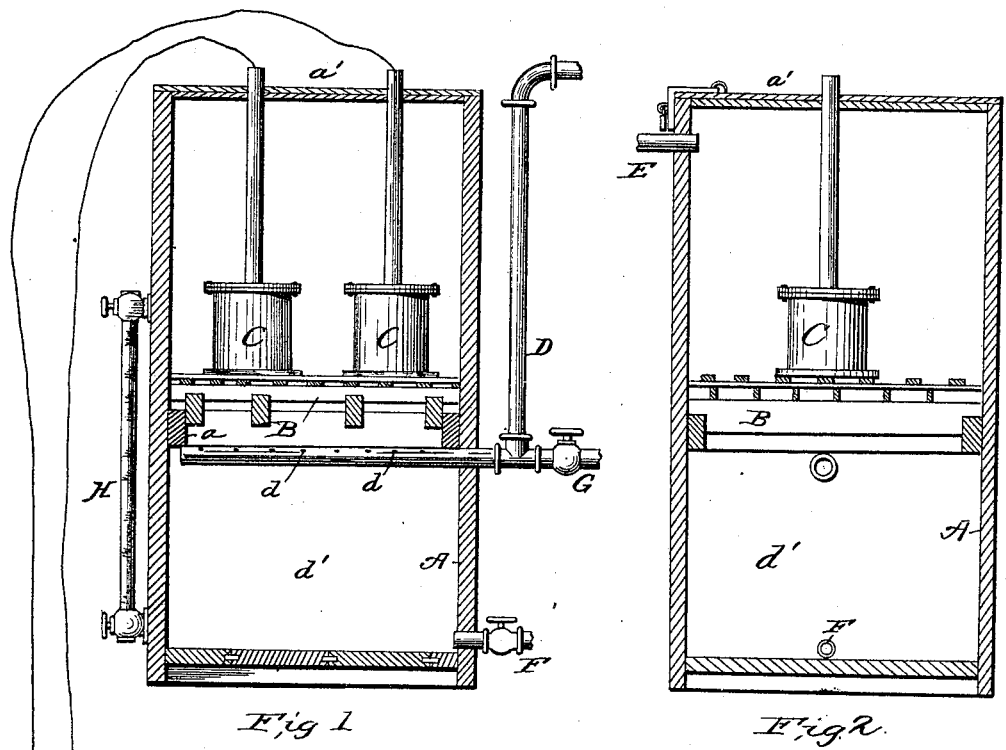
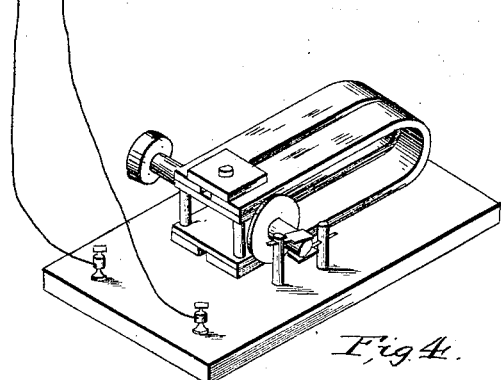
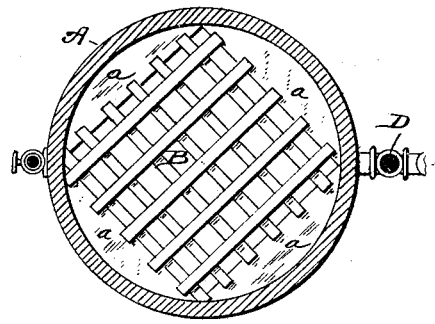
Witnesses
Inventor
Samuel G. Cabell
By his Attorney

UNITED STATES PATENT OFFICE.

SAMUEL G. CABELL, OF WASHINGTON, DISTRICT OF COLUMBIA.

APPARATUS FOR PURIFYING AND AGING LIQUORS AND PURIFYING WATER AND OIL.

SPECIFICATION forming part of Letters Patent No. 354,853, dated December 21, 1886.

Application filed April 20, 1886. Serial No. 199,536. (No model.)

*To all whom it may concern:*

Be it known that I, SAMUEL G. CABELL, a citizen of the United States, residing at Washington, in the District of Columbia, have invented certain new and useful Improvements in Apparatus for Purifying and Aging Liquors and Purifying Water and Oil; and I do hereby declare the following to be a full, clear, and exact description of the invention, such as will enable others skilled in the art to which it appertains to make and use the same.

My invention relates to means or apparatus for aging and purifying liquors and purifying water and oil, and is an improvement on the apparatus described in my Patent No. 341,727, dated May 11, 1886, in which a body of iron resting on the bottom of the purifying-tank and electro-magnets resting on said body of iron is described for use in the process of purifying and aging liquors.

The invention consists in the combination, with a suitable non-conducting or insulated tank or receptacle, of a shelf or body of metal, preferably bars of iron, arranged across the tank a distance above the bottom thereof, and one or more electro-magnets supported by the body of iron or other metal.

It also consists in the combination, with a suitable purifying-tank, of an inlet-pipe leading into said tank a distance above the bottom thereof and below the body of metal and magnets, so that the inflow will not disturb the lower part or volume of liquor, but will pass upward through the bars of iron.

In the drawings, Figure 1 is a vertical section through line $x\,x$ of Fig. 3. Fig. 2 is a similar section through line $y\,y$ of Fig. 3. Fig. 3 is a horizontal section through line $z\,z$ of Fig. 2, and Fig. 4 is a perspective of a "dynamo-electric" generator.

A is a tank, preferably made of wood, of any suitable shape and dimensions, having brackets or supports $a\,a$ on its sides at a distance above the bottom, to allow the impurities to settle.

B B are bars of iron, crossed as shown, supported by the brackets. These bars may be of any suitable size to support the magnets—such as woven wire; but in practice I make them about three inches in thickness. To limit corrosion, the bars may be coated with tin, copper, or other suitable plate.

C C are electro-magnets, the coils of which lead through the cover to a source of electricity, as shown in Fig. 4. The tank has a lid or cover, $a'$, which may be locked and within the control of an inspector or other officer.

D is an inlet-pipe leading from a still or other source of supply, and extends across the tank just below the body of metal, and is provided with perforations $d\,d$ on the upper side, so that the inflow will not disturb or agitate the volume of liquor in the lower part or chamber, $d'$, of the tank.

E is an exit-pipe leading from the upper part of the vessel, to carry off the purified liquor.

H is a glass tube suitably connected with the side of the tank, near the bottom, by which the condition of the sediment or precipitate may be determined by inspection.

F is a cock for drawing off the sediment for cleansing the apparatus.

G is also a cock for drawing off the purified liquid from the upper part of the tank when the continuous flow is arrested.

In operation the liquor flows through pipe D, escapes through perforations $d\,d$ and filling-chamber $d'$, passes up through the spaces in the body of the metal supporting the magnets, is there purified, the impurities settling to the bottom in chamber $d'$, and the pure liquor passes off by exit-pipe F.

Having described my invention, what I claim is—

1. The combination of a purifying tank or receptacle, a metallic shelf or body of metal arranged a distance above the bottom of said tank, and an electro-magnet, substantially as described.

2. The combination, with a purifying tank or receptacle, of an inlet-pipe leading into said tank some distance above the bottom, an exit-pipe leading from the upper part thereof, a body of metal above the inflow-passage, and an electro-magnet resting on the body of metal, substantially as described.

3. The combination, with a purifying tank or receptacle, of an exit-pipe leading from its upper part, an upwardly-perforated inlet-pipe leading into and across said tank some distance above the bottom thereof, to give an upward current and avoid disturbing the contents at the bottom, and a magnetic separator for precipitating impurities to the bottom of the tank, as specified.

4. The combination of a purifying-tank, a metal diaphragm, an inlet-pipe extending across the tank above the bottom and below the diaphragm, an electro-magnet, and a sight-gage, substantially as described.

In testimony whereof I affix my signature in presence of two witnesses.

SAMUEL G. CABELL.

Witnesses:
WM. A. ROSENBAUM,
M. A. BALLINGER.